United States Patent [19]

Collon

[11] Patent Number: 4,781,399
[45] Date of Patent: Nov. 1, 1988

[54] QUICK-CONNECT COUPLING HAVING IMPROVED SEAL

[75] Inventor: George D. Collon, Beacon Falls, Conn.

[73] Assignee: WPM, Inc., Waterbury, Conn.

[21] Appl. No.: 129,250

[22] Filed: Dec. 7, 1987

[51] Int. Cl.⁴ ............................................. F16L 21/08
[52] U.S. Cl. .................................. 285/8; 285/110; 285/316
[58] Field of Search .................. 285/110, 111, 316, 8; 277/205, 207, 212

[56] References Cited

U.S. PATENT DOCUMENTS

| 2,377,812 | 6/1945 | Scheiwer | 285/316 X |
| 2,860,893 | 11/1950 | Clark | 285/316 X |
| 3,386,754 | 6/1968 | Morrison | 285/316 X |
| 3,937,497 | 2/1976 | Studer | 285/111 |

FOREIGN PATENT DOCUMENTS

| 1457165 | 10/1966 | France | 285/110 |
| 6508182 | 1/1966 | Netherlands | 285/110 |
| 1229216 | 4/1971 | United Kingdom | 285/110 |

Primary Examiner—Dave W. Arola
Attorney, Agent, or Firm—Dallett Hoopes

[57] ABSTRACT

A quick-connect coupling for a household faucet or the like and comprising a nipple and a fitting, features an improved seal which is a resilient annulus including a band portion adapted to seal against the inside of the fitting, a wing portion extending down from the top of the band portion and an end portion on the distal end of the wing portion, the end portion including an inward rib. Preferably the rib comprises an inwardly and upwardly facing quarter round, the underside of the end portion being inclined upwardly and outwardly when the fitting is installed on the nipple, whereby the water pressure forces the end portion inward to enhance the seal.

6 Claims, 1 Drawing Sheet

QUICK-CONNECT COUPLING HAVING IMPROVED SEAL

BACKGROUND OF THE INVENTION

1. Field of the Invention

This invention relates to quick-connect couplings of the type used to connect a flexible hose to a stationary nipple. More specifically, the invention relates to an improvement in such a coupling comprising sealing means which permits the extremely easy connection between the coupling fitting and the nipple and at the same time produces an unusually effective seal.

2. Description of the Prior Art

The prior art inludes a number of quick-connect couplings for use in transmitting liquids as well as gases. In a number of such couplings the nipple, which may be mounted either on the end of a section of hose or on a stationary fluid supply, includes downwardly facing stop means having below it a reduced section and an inclined retaining surface comprising a retaining enlargement. The coupling fitting comprises a tubular body having a plurality of openings about its top, each of which receives a ball detent. A spring-biased retaining skirt encircles the body of the fitting, and spring means urges the skirt toward a position in which the ring holds the ball detents inward against or above the retaining surface on the nipple. The fitting also includes sealing means, typically an O-ring, disposed in a groove in the body.

In assembly the retaining skirt is pulled downward against the spring and the fitting body is brought up around the nipple, the ball detents parting to permit passage of the retaining enlargement. Thereafter the retaining skirt is permitted to snap into its retaining position holding the ball detents inward against the retaining surface, the O-ring engaging the nipple below the retaining surface.

In the past, much difficulty has been experienced in engaging such a coupling, because the friction of the O-ring against the nipple has made the coupling difficult to install on the nipple. As an alternative U-cup seals have been tried, but while they have presented less resistance in the coupling process—the pressing of the fitting onto the nipple—the legs of such U-cup seals do not seal well against the nipple at lower pressures. Higher pressure is needed to drive the inner leg against the nipple surface and the outer leg against the wall of the fitting.

Thus, while attempts have been made in the past to improve the ease with which the coupling can be connected, no really satisfactory structure has been arrived at for sealing performance over the full range of fluid pressures which such a coupling may encounter.

SUMMARY OF THE INVENTION

Under the present invention the above-described O ring is replaced by an improved seal, which is especially effective as a seal under a great range of fluid pressures and yet is extremely easy and relatively friction-free in installation. The improved seal is in the form of an integral molded annulus including a band portion disposed sealingly against the back wall of the seal recess in the fitting body. The seal also includes a wing portion integral with the band portion and extending inward and downward from the upper end of the band, the wing portion having on its distal end an enlargement formed in a shape which is convex when viewed from the center of the fitting. The underside of the end portion preferably includes a surface which is inclined outward and upward from the nipple.

As a result of the structure disclosed, with the fitting on the nipple water pressure acting against the end portion of the seal, in a direction perpendicular to the surface, urges the end portion inward toward the center of the coupling so that the engagement of the convex surface against the nipple is enhanced. This enhancement assures an excellent seal. At the same time, because the inward water pressure is not on the seal during the coupling connection process, the frictional forces necessary to be overcome in the connection process are relatively slight as the end portion of the seal lightly engages the nipple surface.

BRIEF DESCRIPTION OF THE DRAWINGS

Other objects and features of the invention will be apparent upon inspection of the following specification and drawings, all of which disclose a non-limiting form of the invention. In the drawings.

DESCRIPTION OF THE PREFERRED EMBODIMENT

Figure 1:
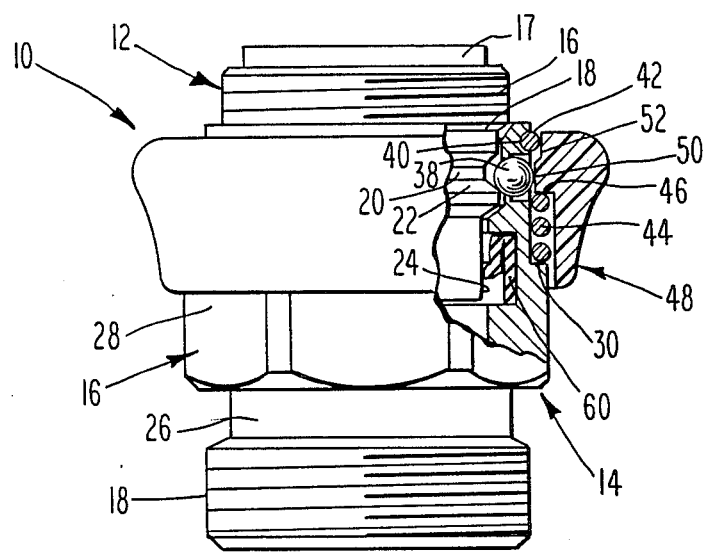
FIG. 1 is a side view of a coupling embodying the invention having a portion broken away to reveal the seal and retaining means.

A quick-connect coupling embodying the invention is generally designated 10 in FIG. 1. It comprises a nipple 12 and a coupling fitting 14. The upper end of the nipple in the embodiment shown is threaded as at 16 and contains a washer 17. The threads may be internal or external and the threads may be used to secure the nipple to a kitchen faucet or the like. The nipple is preferably a metal screw machine part which may be plated.

The nipple includes a downwardly facing stop surface 18 beneath which the lower portion of the body of the nipple may be reduced as at 20 and formed with an inclined outwardly retaining surface 22 comprising a retaining enlargement in the form of a rib. Downwardly from the retaining surface the nipple may be reduced in outside diameter as at 24 to present a smooth sealengaging surface. Alternatively the retaining enlargement may extend directly downward to the lower end of the nipple from the outer dimension of the inclined retaining surface 22.

The coupling fitting 14 preferably comprises a body 16, which typically may also be made of metal on a screw machine. The lower end of the body may be externally threaded as at 18 for the connection of a garden hose, for instance. So as not to interfere with the hose coupling the body may be reduced as at 26 and thereabove may be enlarged and formed with hexagonal flats 28 for easy gripping.

Figure 4:
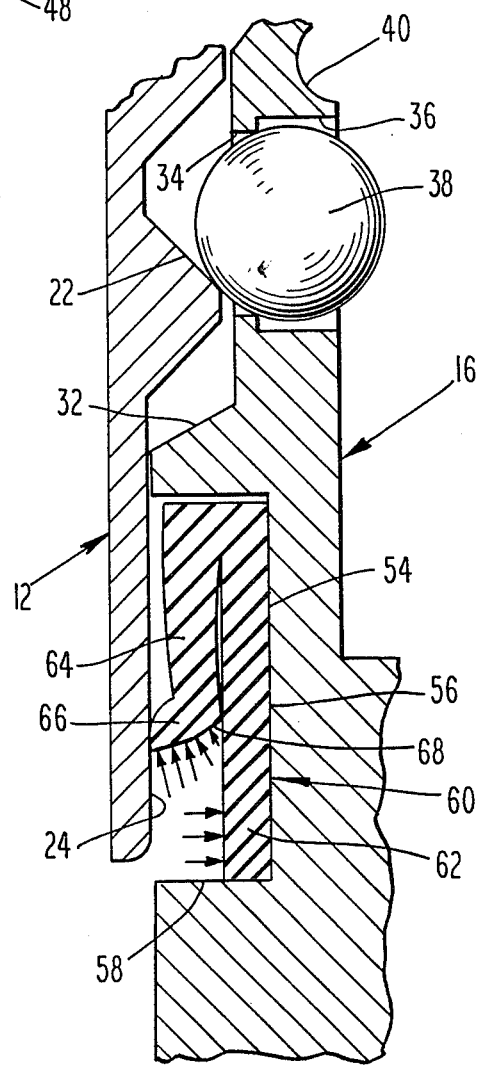
FIG. 4 is a greatly enlarged fragmentary sectional view of a portion of the nipple and coupling fitting showing the sealing action as is involved with the coupling under liquid pressure.

The exterior of the body above the flats 28 is reduced and formed with an annular ledge 30. Thereabove the wall of the fitting inclines inwardly at 32 (FIG. 4) and is reduced in thickness at its upper end. In the reduced area the wall is formed from the inside with circumferentially spaced openings 34, which enlarge in diameter as at 36 toward the outside of the wall. The openings received from the outside ball detents 38 which protrude inwardly through the opening 34, but the diameter of the opening 34 is less than the diameter of the detents 38 so that the ball is retained in its opening, as shown in FIG. 4, when the coupling is not connected.

Above the openings 34, 36, the top wall of the body 16 is formed with a groove 40 to receive a snap-on ring 42 (FIG. 1). A spiral spring 44 surrounds the body and rests on the ledge 30. The upper end of the spring 44 engages a downwardly-facing surface 46 on a plastic skirt 48, which is formed on its outside in a streamlined shape. Above surface 46 the skirt is formed with an inward projection 50 which holds the ball detents 38 inward when the skirt 48 is in its upper position, as shown in FIG. 1. Above the projection the skirt is formed with a recess 52 which abuts the retaining ring 42 when the skirt is in its upper position.

In operation, as is conventional, the coupling may be unconnected by pulling downward on the skirt 34 and permitting the ball detents 38 to move outward past the retaining surface 22 so that the fitting may be downwardly removed from the nipple. In re-connecting, the skirt is again pulled downward against the force of the spring 44 so that the ball detents 38 may move outward in the fitting and into the recess 52 so that they may clear the retaining enlargement comprising the retaining surface 22. At its home position the top of the fitting engages the stop surface 18, and when the skirt 48 is permitted to return to its upper position against ring 42 under the force of spring 44, the ball detents 38 are driven inwardly by the projection 50 to engage the sloping retaining surface 22 and urge the fitting body 16 upward against stop surface 18.

Beneath the inclined surface 32 the wall of the body 16 is formed with a seal recess 54 comprising a back wall 56 and upper and lower side walls 58. Sealing means 60 (FIG. 4) are disposed in the recess 54.

Figure 2:
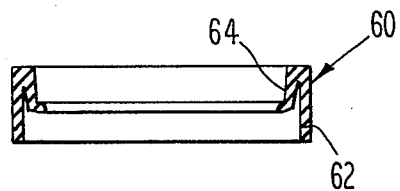
FIG. 2 is a half sectional view of the sealing means of the invention.
Figure 3:
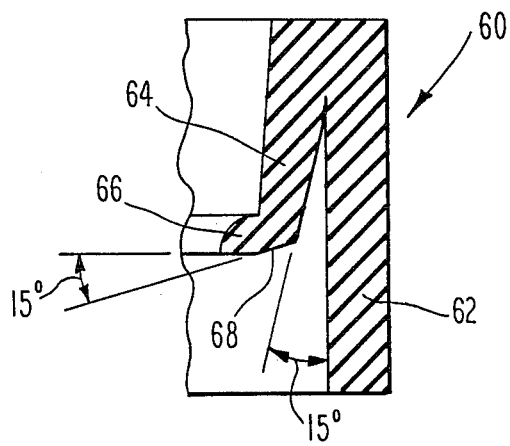
FIG. 3 is an enlarged fragmentary sectional view of the sealing means.

As shown in FIGS. 2 and 3, the sealing means 60 is an annulus comprising a band portion 62 which in installation fits against the back wall 56 (FIG. 4). From the upper end of the band portion a wing portion 64 extends inward and downward in relaxed state (FIGS. 2, 3). Preferably, the wing portion is about one-half as long as the band portion. As shown in FIG. 3, the wing portion 64 tapers, narrowing in thickness toward its lower end. The angle with which the wing portion 64 diverges from the band portion 60 in relaxed state is preferably about 15 degrees.

At its lower end the wing portion 64 is formed with an end portion 66. This takes the form of an inward rib which, preferably, has a curved surface which is convex when viewed from the center of the coupling. It preferably extends through at least 90 degrees of an arc to present a "quarter round." The under surface of the quarter round so formed is flat, and outward of the quarter round the end portion is chamfered off at an angle of preferably 15 degrees upward as viewed in FIG. 4. It should be noted that the quarter round portion extends inward of the seal, inward beyond an imaginary extension of the inner surface of the wing portion of the seal.

Preferably, the seal 60 is integrally molded of BUNA-N rubber of 70 durometer.

FIGS. 2 and 3 depict the seal in a relaxed condition, such as would be the case when the coupling is disconnected.

When the fitting is brought up over the nipple 12, the lower end of the nipple forces the wing portion 64 outward (FIG. 4). Because there is no liquid pressure in the coupling at this time, there is very little friction force exerted by the end portion 66 opposing this assembly. It is an easy connection to make. In the connection process the wing portion 64 is urged outward so that it may contact or virtually contact the band 62. In the snapped-home condition of the coupling the end portion 66 engages the lower end of the nipple and the ball detents 38 engage the surface 22 as shown and described.

While after installation with no liquid in the coupling the ball 60 sealingly engages against the back wall 56 and the end portion 66 engages the lower portion 24 of the nipple sealingly, the sealing quality is enhanced when liquid pressure is established in the coupling as, for instance, when the kitchen faucet is turned on.

As shown by arrows indicating pressure in FIG. 4, there is a component of liquid pressure on the end portion 66, which component is partly directed inwardly of the center of the seal 60. The direction of this component is especially enhanced in the chamfered area 68 already described. This serves to force tighter engagement between the quarter round of the end portion 66 and the nipple. At the same time, as indicated by the arrows on the band 62 pressure drives the band into tighter sealing engagement with the back wall 56. While not shown by arrows in FIG. 4, water in the area between the band 62 and the wing 64 will additionally enhance the seal by forcing the wing toward the nipple and the band into tighter engagement with the back wall 56.

When the liquid in the housing is turned off, on the other hand, the liquid pressure acting against the chamfered area 68 and the more inward surface of the portion 66 disappears, and the force exerted by the seal 60 against the nipple is reduced and makes the disconnection very easy.

Thus, there has been described a quick-fitting coupling having an improved sealing means in which the installation and disconnection may be easily achieved in the absence of substantial frictional force as was the case with the O-ring type of seal. At the same time, due to the force of liquid when the coupling is pressurized, there is achieved a sealing of remarkable quality due to the ingenious use of components of liquid pressure against the surface of the seal.

While the invention is described above in only one form, it is not so limited but is susceptible of many forms. The invention should be thought of, in other words, as being defined by the following claim language or equivalents thereof.

I claim:

1. In a quick-connect coupling including:
   a. a tubular nipple having threads at its upper end adapted to screw on a kitchen faucet or the like, a downwardly facing stop surface beneath the threads and a lower portion comprising an outward retaining surface with an annular retaining enlargement therebelow, and
   b. a coupler fitting having a tubular body received over said nipple lower portion, a portion of the body engaging the stop surface, the body having circumferentially spaced openings adjacent its upper end, a detent disposed in each opening, an annular skirt surrounding the body and having an inward annular projection, spring means urging the skirt upward on the tubular body so that the skirt normally tends to assume a position with the projection holding the detents inward firmly above the enlargement on the nipple to hold the coupler fitting on the nipple, and resilient seal means disposed in an annular recess in the inside of the body, the recess having a flat back wall, the seal means extending inward to engage the nipple below the retaining surface; the improvement wherein the seal means is an integral molded annulus including a band portion disposed sealingly against the back wall of the recess and a wing portion extending inward and downward from the upper end of the band, the wing portion tapering in thickness narrowing as its distal end is approached, its distal end being formed with an inward rib, the inward rib being in the form of an outwardly and upwardly convex curving surface, the curving surface sealingly engaging the nipple in a line of engagement about the periphery of the nipple, a portion of the distal end beyond said line of engagement angling outward and upward to provide a substantially flat surface adapted to resolve the force of fluid pressure thereagainst into a horizontal component urging the curving surface against the nipple more tightly at the line of engagement.

2. The improvement as claimed in claim 1 wherein part of the substsantially flat surface on the seal means is horizontal when the fitting is not installed on the nipple.

3. The improvement as claimed in claim 2 wherein the substantially flat surface includes an upwardly and outwardly inclined portion when the fitting is not installed on the nipple.

4. The improvement as claimed in claim 3 wherein the inclined portion is approximately 15 degrees to the horizontal when the fitting and nipple are apart.

5. The improvement as claimed in claim 1 wherien the wing portion is approximately one-half the length of the band portion.

6. A quick-connect coupling for liquid including sealing means comprising a nipple and a fitting and a resilient annulus including a band portion adapted to seal against the inside of the fitting, a wing portion extending down from the top of the band portion and an end portion on the distal end of the wing portion, the end portion comprising an inward rib being in the form of an outwardly and upwardly convex curving surface, the curving surface sealingly engaging the nipple in a line of engagement about the periphery of the nipple, a portion of the distal end beyond said line of engagement angling outward and upward to provide a substantially flat surface adapted to resolve the force of fluid pressure thereagainst into a horizontal component urging the curving surface against the nipple more tightly at the line of engagement.

* * * * *